United States Patent
Gao et al.

(10) Patent No.: US 10,331,386 B2
(45) Date of Patent: Jun. 25, 2019

(54) RECOGNIZING HARD DISK MOVEMENT

(71) Applicant: EMC Corporation, Hopkinton, MA (US)

(72) Inventors: Jian Gao, Beijing (CN); Hongpo Gao, Beijing (CN); Jamin Jianbin Kang, Beijing (CN); Huibing Xiao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/984,502

(22) Filed: Dec. 30, 2015

(65) Prior Publication Data
US 2016/0196090 A1 Jul. 7, 2016

(30) Foreign Application Priority Data
Jan. 4, 2015 (CN) .......................... 2015 1 0004540

(51) Int. Cl.
*G06F 3/06* (2006.01)
*G06F 11/00* (2006.01)

(52) U.S. Cl.
CPC .......... *G06F 3/0689* (2013.01); *G06F 3/0614* (2013.01); *G06F 3/0632* (2013.01); *G06F 11/006* (2013.01)

(58) Field of Classification Search
USPC ........................................................ 711/114
See application file for complete search history.

(56) References Cited

U.S. PATENT DOCUMENTS

| | | | | |
|---|---|---|---|---|
| 5,148,432 A * | 9/1992 | Gordon | ................. | G06F 3/0601 714/6.32 |
| 6,044,411 A * | 3/2000 | Berglund | ............ | G06F 11/2289 710/10 |
| 6,243,790 B1 * | 6/2001 | Yorimitsu | ............. | G06F 3/0607 710/8 |
| 6,363,457 B1 * | 3/2002 | Sundberg | .............. | G06F 3/0607 711/114 |
| 6,671,776 B1 * | 12/2003 | DeKoning | ............ | G06F 3/0607 710/38 |
| 6,877,110 B2 * | 4/2005 | Suzuki | .................. | G06F 3/0601 711/114 |
| 8,131,919 B1 * | 3/2012 | Gasser | ................ | G06F 12/0653 711/111 |

(Continued)

OTHER PUBLICATIONS

Notification of the First Office Action issued in counterpart Chinese Patent Application No. 2015100045401, dated Mar. 30, 2018.

(Continued)

*Primary Examiner* — Mano Padmanabhan
*Assistant Examiner* — Jean C Edouard
(74) *Attorney, Agent, or Firm* — Brian J. Colandreo; Heath M. Sargeant; Holland & Knight LLP

(57) ABSTRACT

A system and method of recognizing a hard disk movement, the system and method including recognizing hard disk information recorded in a hard disk in response to the hard disk being moved to a slot in a hard disk array, determining the movement type of the hard disk based on the recognized hard disk information, judging validity of the hard disk movement based on the movement type, and updating the hard disk information of the hard disk in response to the hard disk movement being judged as valid, wherein the hard disk information comprises position information of the hard disk in the hard disk array.

12 Claims, 4 Drawing Sheets

(56) References Cited

U.S. PATENT DOCUMENTS

| | | | | |
|---|---|---|---|---|
| 2001/0049800 A1* | 12/2001 | Suzuki | G06F 3/0601 | 714/6.2 |
| 2002/0067562 A1* | 6/2002 | Kagami | G11B 5/012 | 360/31 |
| 2002/0152416 A1* | 10/2002 | Fukuda | G06F 3/0607 | 714/6.32 |
| 2002/0166027 A1* | 11/2002 | Shirasawa | G06F 8/65 | 711/114 |
| 2004/0158763 A1* | 8/2004 | Wang | H04L 1/22 | 714/1 |
| 2005/0091452 A1* | 4/2005 | Chen | G06F 11/1076 | 711/114 |
| 2005/0120093 A1* | 6/2005 | Nakano | G06F 11/2082 | 709/217 |
| 2005/0182899 A1* | 8/2005 | Suzuki | G06F 3/061 | 711/114 |
| 2005/0283655 A1* | 12/2005 | Ashmore | G06F 11/004 | 714/6.32 |
| 2006/0047930 A1* | 3/2006 | Takahashi | G06F 3/0605 | 711/162 |
| 2006/0259812 A1* | 11/2006 | Chen | G11B 20/1883 | 714/6.12 |
| 2007/0130434 A1* | 6/2007 | Chu | G06F 21/80 | 711/163 |
| 2007/0233973 A1* | 10/2007 | Uno | G06F 13/409 | 711/154 |
| 2009/0113235 A1* | 4/2009 | Selinger | G06F 11/108 | 714/6.12 |
| 2009/0268346 A1* | 10/2009 | Heo | G11B 5/4813 | 360/244.2 |
| 2009/0316541 A1* | 12/2009 | Takada | G06F 1/3221 | 369/47.5 |
| 2010/0049917 A1* | 2/2010 | Kono | G06F 3/0605 | 711/114 |
| 2010/0318738 A1* | 12/2010 | Sun | G06F 3/061 | 711/114 |
| 2013/0219213 A1* | 8/2013 | Wu | G06F 11/2069 | 714/6.22 |
| 2014/0019685 A1* | 1/2014 | Ling | G06F 3/0616 | 711/114 |
| 2014/0095815 A1* | 4/2014 | Sims | G06F 11/0727 | 711/161 |
| 2014/0122753 A1* | 5/2014 | Chiu | G06F 3/0653 | 710/74 |

OTHER PUBLICATIONS

Notification of Second Office Action issued in counterpart Chinese Patent Application No. 2015100045401, dated Nov. 21, 2018.

* cited by examiner

RECOGNIZING HARD DISK MOVEMENT

RELATED APPLICATIONS

This application claims priority from Chinese Patent Application Number CN201510004540.1 filed on Jan. 4, 2015 entitled "METHOD AND SYSTEM FOR HARD DISK MOVEMENT RECOGNITION" the content and teachings of which is herein incorporated by reference in its entirety.

FIELD OF THE INVENTION

Embodiments of the present invention generally relate to a method and system for hard disk movement, and more specifically to a method and system for recognizing a hard disk movement in a hard disk array or between different hard disk arrays.

BACKGROUND OF THE INVENTION

A conventional block storage device can be installed with a plurality of hard disks, and performs initialization of each disk drive installed in the hard disk array. The initialization enables the block storage device to use the hard disk to perform an operation such as read, write or deletion. However, in the conventional block storage device, movement of the hard disk is not permitted, meaning that once the hard disk is installed in the block storage device, the hard disk forms cooperation with a certain slot in the hard disk array of the block storage device. Only when the hard disk fails or needs to be replaced can a user use a new hard disk for replacement.

Therefore, it is necessary to introduce a new method and system allowing the hard disk to move in the same hard disk array or between different hard disk arrays to implement flexible use and allocation of the storage space.

SUMMARY OF THE INVENTION

Generally, embodiments of the present invention propose a technical solution to recognition of hard disk movement.

In one aspect, embodiments of the present invention provide a method of recognizing a hard disk movement, including: recognizing hard disk information recorded in a hard disk in response to the hard disk being moved to a slot in a hard disk array; determining a movement type of the hard disk based on the recognized hard disk information; judging a validity of the hard disk movement based on the movement type; and updating the hard disk information of the hard disk in response to the hard disk movement being judged as valid, wherein the hard disk information includes position information of the hard disk in the hard disk array.

In another aspect, embodiments of the present invention provide a system for recognizing a hard disk movement, including: a hard disk information recognizing unit configured to recognize the hard disk information recorded in the hard disk in response to the hard disk being moved to the slot in the hard disk array; a movement type determining unit configured to determine a movement type of the hard disk based on the recognized hard disk information; a movement validity judging unit configured to judge validity of the hard disk movement based on the movement type; and a hard disk information updating unit configured to update the hard disk information of the hard disk in response to the hard disk movement being judged as valid, wherein the hard disk information includes the position information of the hard disk in the hard disk array.

It will be appreciated through the following description that movement of the hard disk in the block storage device may be implemented based on the determination of the hard disk movement type, according to embodiments of the present invention. Embodiments of the present disclosure enable the hard disk, after being installed into a certain slot of a certain hard disk array and being initialized, still to be moved to a slot of other hard disk arrays or another slot of the same hard disk array, and to be used as a hard disk at another position (if such a movement is valid). Other features and advantages of the present invention will be made easy to understand through the following description.

BRIEF DESCRIPTION OF DRAWINGS

The above and other objects, features and advantages of the present disclosure will be made more apparent by describing exemplary embodiments of the present disclosure in more detail with reference to figures, wherein identical numeral references represent identical parts in the exemplary embodiments of the present disclosure.

DETAILED DESCRIPTION OF PREFERRED EMBODIMENTS

Preferred embodiments of the present disclosure will be described in more detail with reference to figures. Although the figures show preferred embodiments of the present disclosure, it should be appreciated that the present disclosure may be implemented in various forms and should not be limited by embodiments described herein. On the contrary, these embodiments are provided to make the present disclosure more transparent and complete, and to convey the scope of the present disclosure completely to those skilled in the art.

Figure 1:
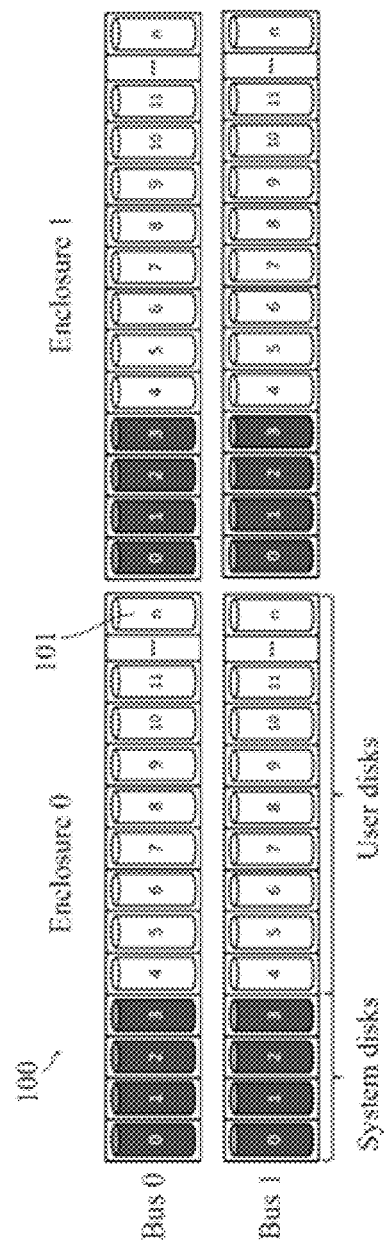
FIG. 1 illustrates a schematic view of a hard disk array architecture according to an embodiment of the present disclosure.

FIG. 1 illustrates a schematic view of a hard disk array 100 architecture according to an embodiment of the present disclosure. The hard disk array 100 shown in FIG. 1 is only an example and should not limit the scopes of functionalities and usages of embodiments of the present disclosure.

As shown in FIG. 1, the hard disk array according to an embodiment of the present disclosure includes a plurality of slots, each slot being able to receive a hard disk. It should be noted that "a hard disk" stated in the embodiment of the present disclosure is not intended to limit the number of physical hard disks to one, but to describe a hard disk unit that can form electrical connection with one slot for data transmission and power transmission. Hence, "a hard disk" in the context may have one physical hard disk or a plurality of physical hard disks. Besides, the "hard disk" in embodiments of the present disclosure is not intended to limit the type of the storage unit to a certain type of hard disk drive, and any device such as a hard disk drive, a solid state drive and the like that can store data should be considered as the "hard disk" of the present disclosure.

The hard disk array may have a plurality of buses. For example, the exemplary hard disk array 100 shown in FIG. 1 has two buses: bus 0 and bus 1. Each bus may have a plurality of enclosures, for example, bus 0 of the exemplary hard disk array 100 shown in FIG. 1 has two enclosures: enclosure 0 and enclosure 1. Finally, each enclosure may have a plurality of slots, for example, the enclosure 0 of the bus 0 of the exemplary hard disk array 100 shown in FIG. 1 has a total of n slots from slot 1 to slot n. Hence, the maximum number of hard disks that can be received in the hard disk array 100 is n×2×2.

In addition, each enclosure has a fixed number of system slots to receive hard disks as system disks, for example, as far as the embodiment shown in FIG. 1 is concerned, each enclosure has four system slots and n−4 user slots. The system disks usually have a plurality of hard disks and occupy a plurality of system slots according to needs, which usually does not allow the user to perform operation such as read, write or deletion, and the data therein may be concealed for the user. On the other hand, the user disks usually may be operated by the user (who has the permission), and the data in the user disks is allowed to be moved by the user. At least two hard disks of the user disks may be bound therebetween to form a Redundant Array of Independent Disks (RAID), to improve data transmission efficiency and to be able to provide a fault tolerating function through data verification.

Figure 2:
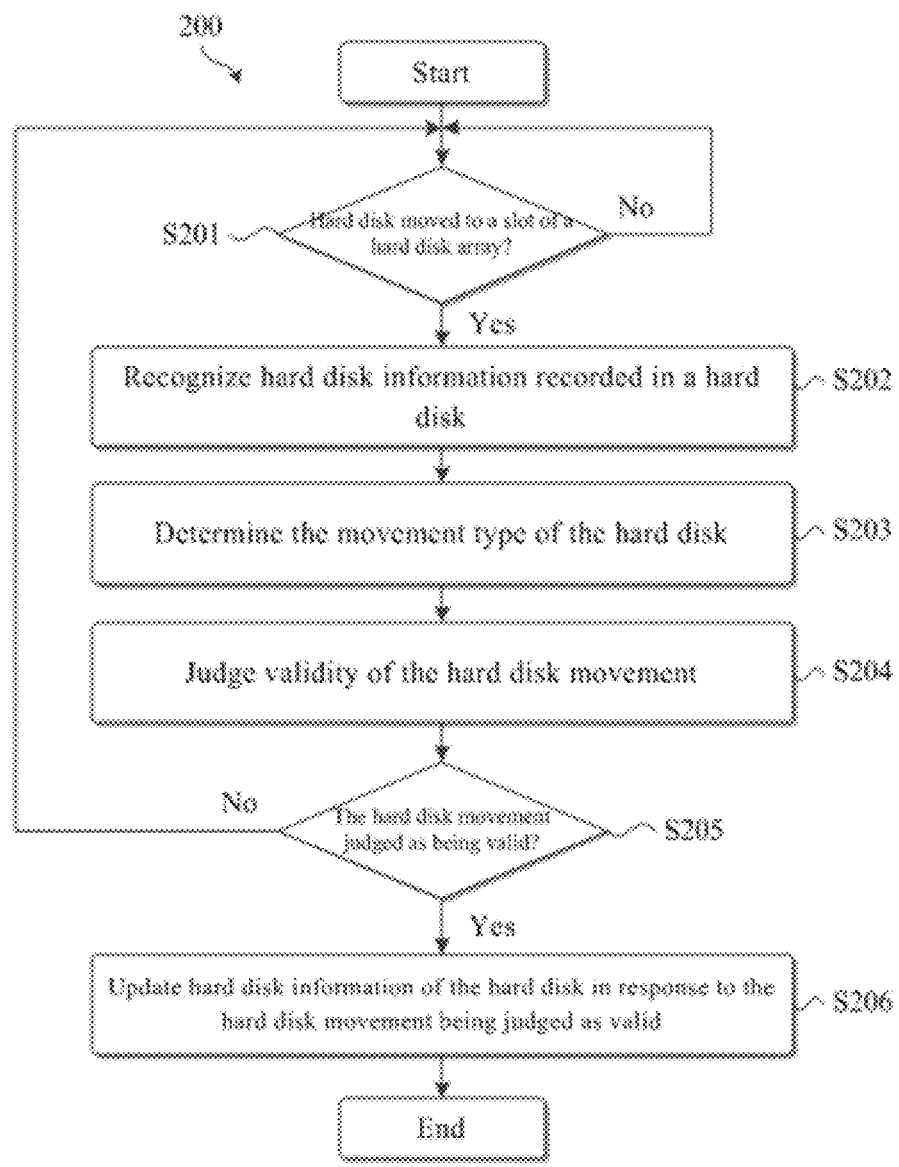
FIG. 2 illustrates a schematic flowchart of a method of recognizing a hard disk movement for implementing an embodiment of the present disclosure.

Embodiments of the present invention will be described in detail as follows. FIG. 2 illustrates a schematic flowchart of a method 200 of recognizing a hard disk movement that can implement an embodiment of the present disclosure.

First, in step S201, whether there is a hard disk being moved to a slot of the hard disk array is judged. If a hard disk is detected as having been moved to the slot of the hard disk array, hard disk information in the hard disk is identified in step S202. The hard disk information may be recorded in a segment of information in the hard disk in the form of a data head, or stored in a segment of information in the hard disk in a form of a readable file. The embodiment of the present disclosure is not intended to limit the form of the hard disk information. No matter if the hard disk is initialized by a certain hard disk array, the embodiment of the present disclosure is intended to describe that the hard disks (even if not subjected to initialization) may all have the hard disk information. However, as far as an un-initialized hard disk is concerned, it may have a predetermined specific value indicating that the hard disk is not subjected to initialization as the hard disk information, or may have empty hard disk information.

The hard disk information according to the embodiment of the present disclosure may have position information. The position information may be a specific position of the hard disk in a certain hard disk array shown in FIG. 1. By way of example only, the position information in the hard disk information may define which slot of which enclosure in which bus. For example, <0, 1, 2> is the third slot in enclosure 1 of bus 0 (in the embodiment of FIG. 1, the first four slots of each enclosure are system slots, so the position information <0, 1, 2> indicates that the hard disk is a system disk). If the hard disk is not subjected to any hard disk array initialization, the position information may be empty, or may be a predetermined value that is pre-defined and indicates that the hard disk is a newly-added hard disk, for example, <−1, −1, −1>. However, it should be noted that the present disclosure is not intended to limit the format or form of the position information, and any format or form of position information that can reflect the position of the hard disk falls within the protection scope of the present disclosure.

According to an embodiment of the present disclosure, if a hard disk is removed from a certain slot in the hard disk array, the position information in the hard disk information indicates the position where the hard disk lies last time in the array. If the hard disk is connected with a certain slot in the hard disk array and the hard disk is judged as valid (which will be described below in detail), the position information in the hard disk information will be updated, indicating a position where it lies now in the array. On the contrary, if the hard disk is connected with a certain slot in the hard disk array, but the hard disk is judged as invalid, the position information in the hard disk information will not be updated, indicating the position where it lies last time.

According to the embodiment of the present disclosure, the hard disk information may further include initialization information which indicates whether the hard disk is a newly-added hard disk or previously has already been used in a certain hard disk array. As stated above, the newly-added hard disk may have hard disk information which may be preset by a supplier in all the supplied hard disks. By way of example only, the initialization information in the hard disk information may be represented by 0 and 1, with "0" representing that the hard disk is not initialized (namely, may represent the newly-added hard disk) while "1" representing that the hard disk has already been initialized. On the other hand, the newly-added hard disk may also have empty hard disk information. It should be appreciated that embodiments of the present disclosure are not intended to limit the form of representing the initialization information, and any representation form that can be read should be included in the scope of the present disclosure.

Hence, in the embodiment of the present disclosure, if a certain hard disk is inserted in a certain slot in a certain hard disk array, the hard disk information recorded in the hard disk cannot be recognized immediately. For example, if the initialization information in the hard disk information shows that it is not initialized, the hard disk may be judged as the newly-added hard disk.

According to an embodiment of the present disclosure, the hard disk information may further include array serial number information. FIG. 1 only shows an exemplary hard disk array 100. However, the block storage device according to the embodiment of the present disclosure may have a plurality of hard disk arrays, so the hard disk movement between these arrays should be detected. By way of example only, the array serial number information in the hard disk information may be a non-negative integer. For example, 3 may indicate the fourth hard disk array. Alternatively, the array serial number information may be a character string of any length and indicate a serial number of an array which is specific and cannot be repeated. If the hard disk is not subjected to any hard disk array initialization, the array serial number information may be empty, or may be a predetermined value that is pre-defined, for example −1, indicating the hard disk is a newly-added hard disk. However, it should be noted that the present disclosure is not intended to limit the format or form of the array serial number information, and any format or form of array serial number information that can reflect the serial number of the array where the hard disk lies falls within the protection scope of the present disclosure.

According to an embodiment of the present disclosure, the hard disk information may further include hard disk type information, for example, a shown in FIG. 1, the hard disk type information may include whether the hard disk belongs to a system disk or a user disk. Although whether the hard disk belongs to the system disk or user disk can already be inferred from the position information in the hard disk information (namely, whether it is used as a system disk or a user disk last time), according to the embodiment of the present disclosure, it is also possible that the hard disk information directly contains the hard disk type information. By way of example only, the hard disk type information in the hard disk information may be represented by 0 and 1, in which "0" represents that the hard disk is a system disk, while "1" represents that the hard disk is a user disk. Alternatively, the hard disk type information may also be a character string of any length. For example, the system disk may be represented as "SYST" while the user disk may be represented as "USER." If the hard disk is not subjected to any hard disk array initialization, the array serial number information may be empty, or may be a predetermined value that is pre-defined, for example −1, indicating the hard disk is a newly-added hard disk, or any pre-defined character string. However, it should be noted that the present disclosure is not intended to limit the format or form of the hard disk type information, and any format or form of hard disk type information that can reflect the hard disk type falls within the protection scope of the present disclosure.

According to an embodiment of the present disclosure, if the hard disk type information is identified as a user disk, whether the hard disk belongs to RAID may also be judged. For example, as an exemplary embodiment, a memory configuration in the hard disk array can be used to judge whether a certain hard disk belongs to RAID. In the embodiment of the present disclosure, the system disk in the hard disk array belongs to RAID, but the user disk in the hard disk array might or might not belong to RAID. Whether it belongs to the RAID is configured by the user according to needs, and therefore will not be detailed herein.

In step S203, a movement type of the hard disk is determined. The determining step may be obtained by comparing a current position of the mobile hard disk in the hard disk array and the hard disk information recorded in the hard disk (namely, the position of the hard disk last time).

According to an embodiment of the present disclosure, when the hard disk is inserted into a certain slot, it is desirable to obtain some information about the inserted hard disk, for example, whether the hard disk is a newly-added hard disk, a user disk in other arrays, a system disk in other arrays, an unbound user disk in the same array, a bound user disk in the same array and a system disk in the same array (the system disk may be defaulted as being bound). Hence, according to the insertion position of the hard disk, movement types of the hard disk may be classified into 15 types as respectively listed in the following Table 1.

TABLE 1

| No. | Movement types of a drive |
|---|---|
| 1 | New drive inserted to a user slot |
| 2 | New drive inserted to a system slot |
| 3 | User drive from other array inserted to a user slot |
| 4 | User drive from other array inserted to a system slot |
| 5 | Unbound user drive from the current array inserted to its original user slot |
| 6 | Unbound user drive from the current array inserted to a different user slot |
| 7 | Unbound user drive from the current array inserted to a system slot |
| 8 | Bound user drive from the current array inserted to its original user slot |
| 9 | Bound user drive from the current array inserted to a different user slot |
| 10 | Bound user drive from the current array inserted to a system slot |
| 11 | System drive from other array inserted to a user slot |
| 12 | System drive from other array inserted to a system slot |
| 13 | System drive from the current array inserted to its original system slot |
| 14 | System drive from the current array inserted to a different system slot |
| 15 | System drive from the current array inserted to a user slot |

According to an embodiment of the present disclosure, each of the movement type of the hard disk may be determined by specific hard disk information and an insertion position of the hard disk in the block storage device, which may be obtained from Table 2.

TABLE 2

| Serial numbers of hard disk movement types | Initialization information | Whether the array serial number information accords with the array | Hard disk type information | Whether the hard disk belongs to RAID | Which slot the position of the hard disk lies in | Whether the position information accords with the position |
|---|---|---|---|---|---|---|
| 1 | 0 | Not applicable | Not applicable | No | User sot | Not applicable |
| 2 | 0 | Not applicable | Not applicable | No | System slot | Not applicable |
| 3 | 1 | No | User disk | Not applicable | User sot | Not applicable |
| 4 | 1 | No | User disk | Not applicable | System slot | Not applicable |
| 5 | 1 | Yes | User disk | No | User sot | Yes |
| 6 | 1 | Yes | User disk | No | User sot | No |
| 7 | 1 | Yes | User disk | No | System slot | No |
| 8 | 1 | Yes | User disk | Yes | User sot | Yes |

TABLE 2-continued

| Serial numbers of hard disk movement types | Initialization information | Whether the array serial number information accords with the array | Hard disk type information | Whether the hard disk belongs to RAID | Which slot the position of the hard disk lies in | Whether the position information accords with the position |
|---|---|---|---|---|---|---|
| 9 | 1 | Yes | User disk | Yes | User sot | No |
| 10 | 1 | Yes | User disk | Yes | System slot | No |
| 11 | 1 | No | System disk | Not applicable | User sot | Not applicable |
| 12 | 1 | No | System disk | Not applicable | System slot | Not applicable |
| 13 | 1 | Yes | System disk | Yes | System slot | Yes |
| 14 | 1 | Yes | System disk | Yes | System slot | No |
| 15 | 1 | Yes | System disk | Yes | User sot | No |

As shown in Table 2, 0 as the initialization information represents that the hard disk is not initialized, and 1 represents that the hard disk has already been initialized. If the hard disk is not initialized, comparison of the array serial number, the hard disk type information, and comparison of the position information all do not apply. Besides, if the array serial number information indicates difference from the array of the slot in which the hard disk is inserted, this indicates that the hard disk comes from another hard disk array, and whether the hard disk belongs to the RAID and comparison of the position information do not apply.

In step S204, validity of movement of the hard disk is judged based on the determined hard disk movement type. This may be preset by the user or system, namely, any type of movement is not allowed. For example, the movement type 10, namely, "bound user drive from the current array inserted to a system slot" is not to be allowed, and meanwhile movement type 15, namely, "system drive from the current array inserted to a user slot" is allowed.

In step S205, if the movement type of the hard disk is judged as valid, for example, the movement type is determined as the above exemplified movement type 15, the hard disk information of the hard disk may be updated in step S206 so that its hard disk information accords with the information of the slot of the currently inserted hard disk array. On the contrary, if the movement type of the hard disk is judged as invalid, the hard disk information of the hard disk will not be updated.

Figure 3:
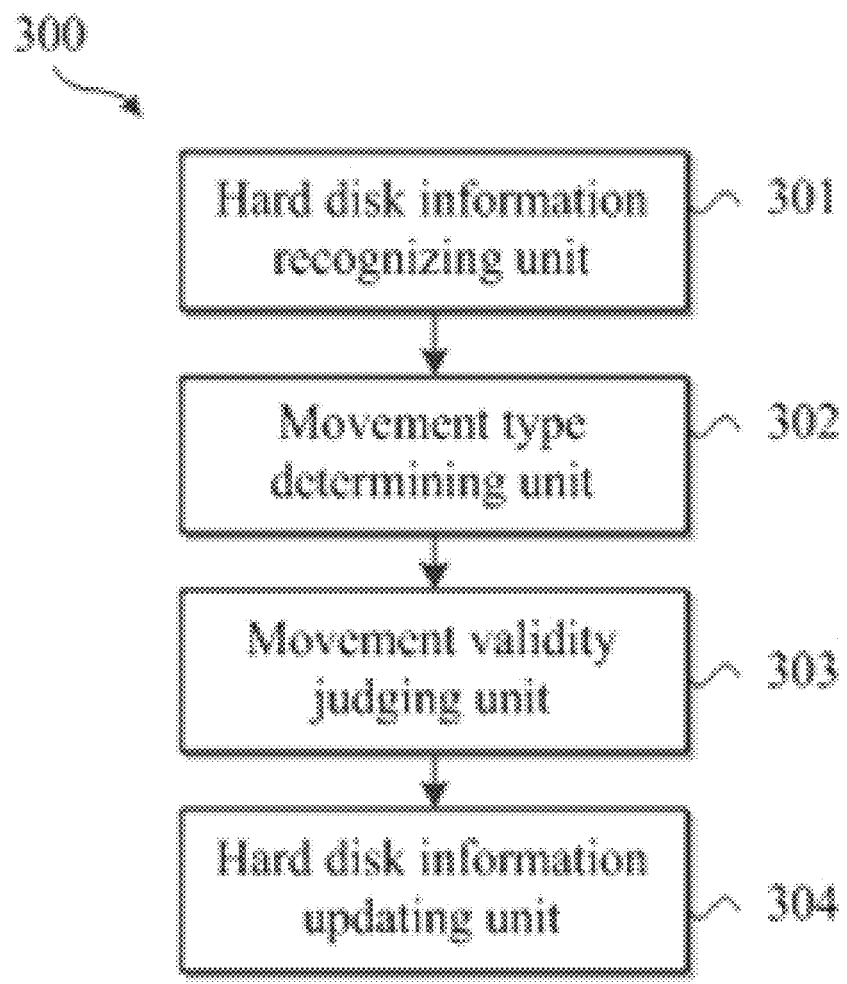
FIG. 3 illustrates a schematic block diagram of a system of recognizing a hard disk movement for implementing an embodiment of the present disclosure.

FIG. 3 illustrates a block diagram of a system 300 for recognizing the hard disk movement according to an exemplary embodiment of the present disclosure. As shown in FIG. 3, the system 300 includes a hard disk information recognizing unit 301 configured to recognize the hard disk information recorded in the hard disk in response to the hard disk being moved to the slot in the hard disk array; a movement type determining unit 302 configured to determine the movement type of the hard disk based on the recognized hard disk information; a movement validity judging unit 303 configured to judge validity of the hard disk movement based on the movement type; and a hard disk information updating unit 304 configured to update the hard disk information of the hard disk in response to the hard disk movement being judged as valid, wherein the hard disk information includes the position information of the hard disk in the hard disk array.

In some embodiments, the movement type determining unit 302 may include a position information comparing unit configured to compare the position of the hard disk in the hard disk array and the position information in the hard disk.

In some embodiments, the hard disk information may include at least one of the following items: hard disk type information, initialization information, and array serial number information.

In some embodiments, the movement type determining unit 302 may include an array serial number comparing unit configured to compare an array serial number of the hard disk in the hard disk array and the array serial number information in the hard disk.

In some embodiments, the hard disk type information may include system disk and user disk.

In some embodiments, the system may include a redundant array of independent hard disk judging unit configured to judge whether the hard disk belongs to a redundant array of independent hard disk in response to the hard disk type information being recognized as the user disk.

The above embodiments of the present disclosure may make the hard disk movement in the block storage device possible because the movement types of the hard disk can be determined and whether the judgment is valid is judged based on the determined movement type. The user may pre-determine whether the hard disk belongs to the valid movement type or the invalid movement type, and achieves the hard disk movement based on the determined valid movement type of the hard disk.

Figure 4:
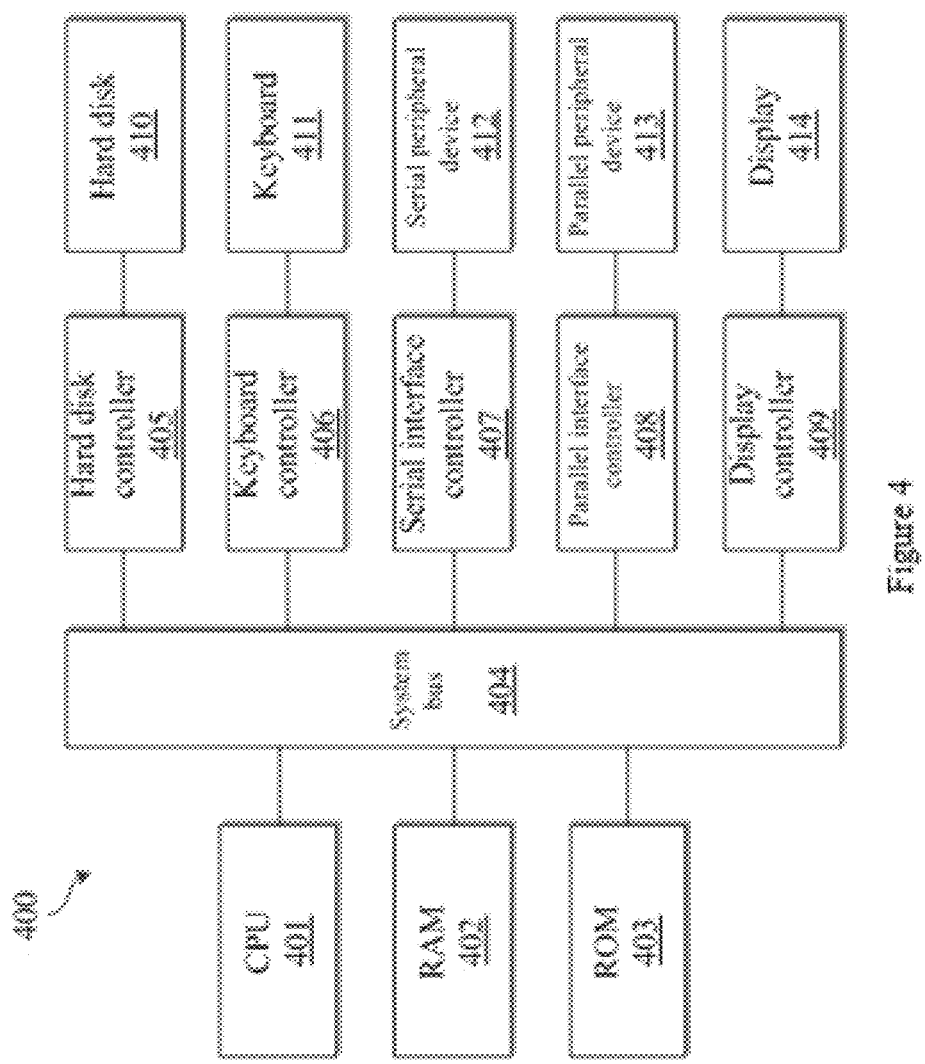
FIG. 4 illustrates a schematic block diagram of a computer system adapted to practice an embodiment of the present disclosure.

FIG. 4 illustrates a schematic block diagram of a computer system adapted to practice an embodiment of the present disclosure. As shown in FIG. 4, the computer system as shown in the figure includes a CPU (Central Processing Unit) 401, a RAM (Random Access Memory) 402, a ROM (Read Only Memory) 403, a system bus 404, a hard disk controller 405, a keyboard controller 406, a serial interface controller 407, a parallel interface controller 408, a display controller 409, a hard disk 410, a keyboard 411, a serial peripheral device 412, a parallel peripheral device 413 and a display 414. Among these components, connected to the system bus 404 are the CPU 401, the RAM 402, the ROM 403, the hard disk controller 405, the keyboard controller 406, the serial interface controller 407, the parallel interface controller 408 and the display controller 409. The hard disk 410 is coupled to the hard disk controller 405; the keyboard 411 is coupled to the keyboard controller 406; the serial peripheral device 412 is coupled to the serial interface controller 407; the parallel peripheral device 413 is coupled to the parallel interface controller 408; and the display 414 is coupled to the display controller 409.

It should be understood that the structural block diagram in FIG. 4 is shown only for illustration purpose, and is not intended to limit the scope of the present invention. In some cases, some devices may be added or reduced according to specific situations.

Particularly, besides the hardware embodiments, embodiments of the present invention may be implemented in the manner of a computer program product. For example, the method 200 as described with reference to FIG. 2 may be implemented via a computer program product. This computer program product may be stored in RAM 402, ROM 403, flash disk 410 and/or any suitable storage medium as illustrated in FIG. 4, or downloaded to the computer system 400 from a suitable location in the network. The computer program product may include a computer code portion including a program instruction that may be executed through a suitable processing device (for example, CPU 401 in FIG. 4). The program instruction may at least include: an instruction for enabling one or more entities to execute a task set including a plurality of tasks, each task in the plurality of tasks being used to access the storage system; an instruction for obtaining an index set of the storage system based on the execution result, the index set including one or more indices for indicating the performance of the storage system; and an instruction for adjusting the task set based on the index set for subsequent execution of the one or more entities.

It should be noted that, the embodiments of the present invention can be implemented in software, hardware or the combination thereof. The hardware part can be implemented by a special logic; the software part can be stored in a memory and executed by a proper instruction execution system such as a microprocessor or a design-specific hardware. The normally skilled in the art may understand that the above method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present invention may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

It should be noted that although a plurality of means or sub-means of the device have been mentioned in the above detailed depiction, such partitioning is merely non-compulsory. In actuality, according to the embodiments of the present invention, the features and functions of the above described two or more means may be embodied in one means. In turn, the features and functions of the above described one means may be further embodied in more modules.

Besides, although operations of the present methods are described in a particular order in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, and/or a step may be divided into a plurality of steps for execution.

Although the present invention has been depicted with reference to a plurality of embodiments, it should be understood that the present invention is not limited to the disclosed embodiments. The present invention intends to cover various modifications and equivalent arrangements included in the spirit and scope of the appended claims. The scope of the appended claims meets the broadest explanations and covers all such modifications and equivalent structures and functions.

What is claimed is:

1. A method of recognizing a hard disk movement in a data storage system, comprising:
    setting which types of movement are valid in the data storage system;
    recognizing hard disk information recorded in a hard disk in response to the hard disk being moved to a slot in a hard disk array, wherein the hard disk information includes the hard disk location and a type of the hard disk;
    determining a movement type of the hard disk based on the recognized hard disk information, wherein the recognized hard disk information includes whether the hard disk is one of a system disk and a user disk, used to determine the movement type of the hard disk;
    judging validity of the hard disk movement based on the movement type; and
    updating the hard disk information of the hard disk in response to the hard disk movement being judged as valid;
    wherein the hard disk information comprises position information of the hard disk in the hard disk array.

2. The method of recognizing the hard disk movement according to claim 1, wherein determining the movement type of the hard disk comprises: comparing a position of the hard disk in the hard disk array and the position information in the hard disk.

3. The method of recognizing the hard disk movement according to claim 1, wherein the hard disk information further comprises at least one of the following items: hard disk type information; initialization information; and array serial number information.

4. The method of recognizing the hard disk movement according to claim 3, wherein determining the movement type of the hard disk comprises: comparing an array serial number of the hard disk in the hard disk array and the array serial number information in the hard disk.

5. The method of recognizing the hard disk movement according to claim 3, wherein the hard disk type information comprise whether the hard disk is one of the system disk and the user disk.

6. The method of recognizing the hard disk movement according to claim 5, comprising: judging whether the hard disk belongs to a redundant array of independent hard disk in response to the hard disk type information being recognized as the user disk.

7. A system, comprising:
    a data storage system including two or more hard disks; and
    computer-executable program logic encoded in memory of one or more computers enabled to recognize movement of a hard disk, of the two or more hard disks, in the data storage system, wherein the computer-executable program logic is configured for the execution of:

defining which types of movement are valid in the data storage system;

recognizing hard disk information recorded in the hard disk in response to the hard disk being moved to a slot in a hard disk array, wherein the hard disk information includes the hard disk location and a type of the hard disk;

determining a movement type of the hard disk based on the recognized hard disk information, wherein the recognized hard disk information includes whether the hard disk is one of a system disk and a user disk, used to determine the movement type of the hard disk;

judging validity of the hard disk movement based on the movement type; and updating the hard disk information of the hard disk in response to the hard disk movement being judged as valid;

wherein the hard disk information comprises position information of the hard disk in the hard disk array.

8. The system of claim 7, wherein determining the movement type of the hard disk comprises: comparing a position of the hard disk in the hard disk array and the position information in the hard disk.

9. The system of claim 7, wherein the hard disk information further comprises at least one of the following items: hard disk type information; initialization information; and array serial number information.

10. The system of claim 9, wherein determining the movement type of the hard disk comprises: comparing an array serial number of the hard disk in the hard disk array and the array serial number information in the hard disk.

11. The system of claim 9, wherein the hard disk type information comprise whether the hard disk is one of the system disk and the user disk.

12. The system of claim 11, wherein the computer-executable program logic is further configured for the execution of: judging whether the hard disk belongs to a redundant array of independent hard disk in response to the hard disk type information being recognized as the user disk.

* * * * *